US010710657B2

(12) United States Patent
Osada et al.

(10) Patent No.: US 10,710,657 B2
(45) Date of Patent: Jul. 14, 2020

(54) SUSPENSION ASSEMBLY MOUNTING METHOD

(71) Applicant: HONDA MOTOR CO., LTD., Tokyo (JP)

(72) Inventors: Atsushi Osada, Tochigi (JP); Takeshi Hara, Tochigi (JP); Hideari Kamachi, Tochigi (JP); Takeshi Iura, Tochigi (JP); Hiroki Sakabe, Tochigi (JP); Shinji Sawada, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 15/892,494

(22) Filed: Feb. 9, 2018

(65) Prior Publication Data

US 2018/0257722 A1 Sep. 13, 2018

(30) Foreign Application Priority Data

Mar. 7, 2017 (JP) .................................. 2017-043331

(51) Int. Cl.
*B62D 65/12* (2006.01)
*B60G 7/00* (2006.01)

(52) U.S. Cl.
CPC ............. *B62D 65/12* (2013.01); *B60G 7/006* (2013.01); *B23P 2700/14* (2013.01);
(Continued)

(58) Field of Classification Search
CPC ...... B62D 65/12; B62D 65/02; B62D 65/022; B62D 65/024; B62D 65/026; B60G 7/006;
(Continued)

(56) References Cited

U.S. PATENT DOCUMENTS 8,276,260 B2 * 10/2012 Kohler ................... B62D 65/12
29/242
9,555,847 B2 * 1/2017 Shimoda ............... B62D 65/12
(Continued)

FOREIGN PATENT DOCUMENTS

| JP | 2001-010563 | 1/2001 |
| JP | 4595799 | 10/2010 |
| JP | 2016-034813 | 3/2016 |

OTHER PUBLICATIONS

Japanese Office Action dated Aug. 28, 2018, 2 pages.

*Primary Examiner* — Sarang Afzali
(74) *Attorney, Agent, or Firm* — Rankin, Hill & Clark LLP

(57) ABSTRACT

The suspension assembly mounting method includes: a step of mounting the suspension assembly on a pallet having a support body and a movable member relatively movable with respect to the support body, so as to fix the base body to the support body and engage the arm member with the movable member; a step of causing the movable member to press the arm member upward so that the suspension assembly becomes a position where its own weight load equivalent to the vehicle body weight is applied; a step of lifting the pallet from under the vehicle body and contacting the suspension assembly to the vehicle body; a step of raising the pallet while stopping the movable member from pressing after the contacting; and a vehicle mount step of mounting the suspension assembly on the vehicle body while causing the movable member to press the arm member upward.

2 Claims, 10 Drawing Sheets

(52) U.S. Cl.
CPC ...... *B60G 2206/82* (2013.01); *B60G 2206/91* (2013.01); *Y10T 29/49829* (2015.01); *Y10T 29/53978* (2015.01)

(58) Field of Classification Search
CPC ............ B60G 2206/91; B60G 2206/82; B21D 53/88; B23P 21/00; B23P 2700/50; B25B 11/02; B25B 27/14; Y10T 29/49826; Y10T 29/49829; Y10T 29/4984; Y10T 29/49622; Y10T 29/5397
See application file for complete search history.

(56) References Cited

U.S. PATENT DOCUMENTS

| | | | |
|---|---|---|---|
| 10,053,345 B2* | 8/2018 | Kim | B66F 7/28 |
| 2014/0119874 A1* | 5/2014 | Choi | B65D 65/18 |
| | | | 414/749.1 |
| 2014/0353116 A1* | 12/2014 | Kozasa | B62D 65/10 |
| | | | 198/346.3 |

* cited by examiner

SUSPENSION ASSEMBLY MOUNTING METHOD

BACKGROUND OF THE INVENTION

Field of the Invention

The present invention relates to a suspension assembly mounting method and an apparatus for the same.

Description of the Related Art

In order to ensure ride comfort of a vehicle, Japanese Patent No. 4595799 and Japanese Patent Laid-Open No. 2016-034813 disclose a method for mounting a suspension assembly in a finished vehicle state by lifting the suspension assembly up to under a suspended vehicle body and compressing the suspension assembly upward against the vehicle body when the suspension is mounted (see FIGS. 3 and 7 in Japanese Patent Laid-open No. 2016-034813).

A recent method for mounting a suspension assembly has used a mounting robot for lifting the suspension assembly to mount the suspension assembly on the vehicle body. However, when the suspension assembly is compressed upward, in order to avoid insufficient compression force and deflection of the mounting robot, the method requires an auxiliary lifter or the like to support the suspension assembly. Consequently, this method involves a problem that a large facility or device is required for mounting the suspension assembly.

SUMMARY OF THE INVENTION

In view of the above conventional problem, the present invention has been made, and an object of the present invention is to provide a suspension assembly mounting method capable of simplifying a facility for mounting the suspension assembly, and the apparatus for the same.

A suspension assembly mounting method of the present invention is a method for mounting a suspension assembly on a vehicle body, the suspension assembly having a base body and an arm member pivotally attached to the base body, the method comprising:

a pallet mount step of mounting the suspension assembly on a pallet having a support body and a movable member relatively movable with respect to the support body, so as to fix the base body to the support body and engage the arm member with the movable member;

a step of causing the movable member to press the arm member upward so that the suspension assembly becomes a position where its own weight load equivalent to a weight of the vehicle body is applied;

a step of lifting the pallet from under the vehicle body and contacting the suspension assembly to the vehicle body;

a step of raising the pallet while stopping the movable member from pressing after the contacting; and a vehicle mount step of mounting the suspension assembly on the vehicle body while causing the movable member to press the arm member upward.

A suspension assembly mounting apparatus of the present invention is a suspension assembly mounting apparatus for mounting a suspension assembly on a vehicle body, the suspension assembly having a base body and an arm member pivotally attached to the base body, the apparatus comprising a support body and a pallet having a movable member relatively movable with respect to the support body, wherein the pallet includes a drive unit assuming a first position by driving the movable member to press the arm member upward and a second position by stopping the movable member from pressing and opening the arm member downward.

DETAILED DESCRIPTION OF THE PREFERRED EMBODIMENTS

Hereinafter, embodiments of the present invention will be described with reference to the accompanying drawings.

First Embodiment

Figure 1:
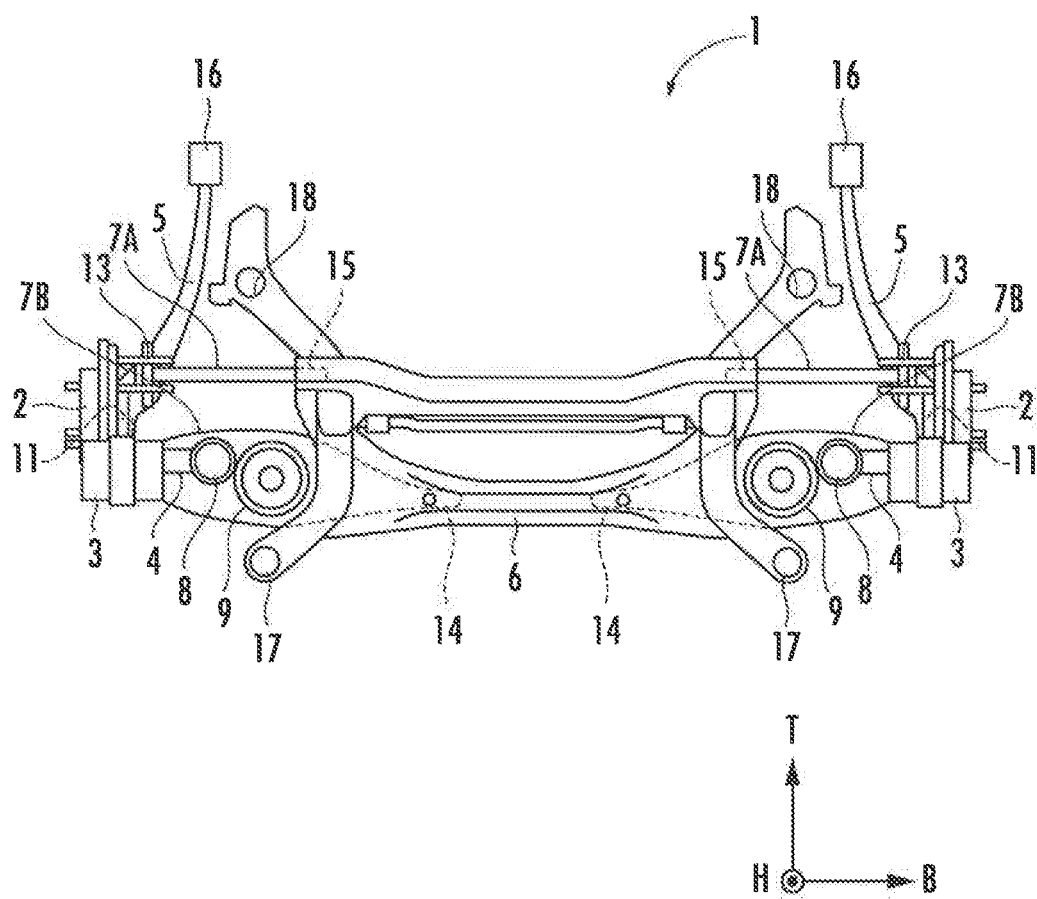
FIG. 1 is a plan view illustrating a suspension assembly for a rear wheel according to a first embodiment of the present invention.
Figure 2:
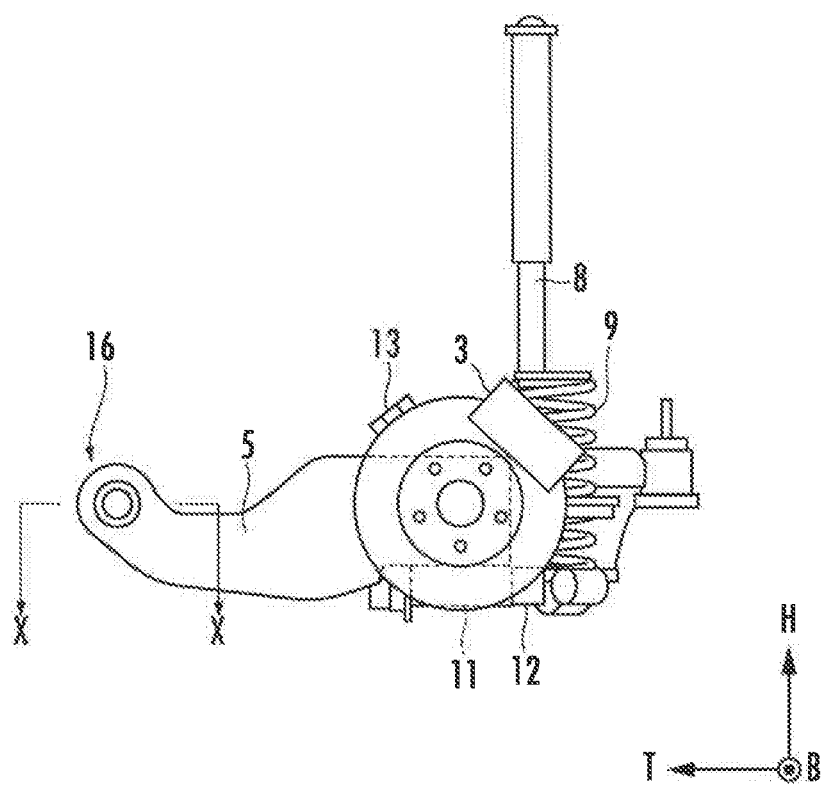
FIG. 2 is a side view of FIG. 1.

FIG. 1 is a plan view illustrating a suspension assembly 1 for a rear wheel according to a first embodiment of the present invention. FIG. 2 is a left side view of the suspension assembly 1 illustrated in FIG. 1. Note that in the figures, T indicates the front-rear direction of the vehicle body, B indicates the width direction of the axle, and H indicates the vertical direction of the vehicle body.

As illustrated in FIGS. 1 and 2, the suspension assembly 1 includes a knuckle 4 rotatably supporting a rear wheel (unillustrated) via an axle 2 and holding a disc brake 3; a trailing arm 5 connecting the knuckle 4 to the vehicle body (unillustrated); a sub-frame 6 contacting the vehicle body (unillustrated); an upper arm 7A and a lower arm 7B connecting the knuckle 4 to the sub-frame 6; a damper 8 connected to the knuckle 4 and contacting the vehicle body (unillustrated); and a spring 9 sandwiched between the lower arm 7B and the vehicle body (unillustrated). The damper 8 and the spring 9 give a damping force and an elastic force to the trailing arm 5, and the upper arm 7A and the lower arm 7B respectively. Note that a member including the trailing arm 5, the upper arm 7A and the lower arm 7B is also referred to as an arm member.

The knuckle 4 is rotatably connected to a rear side of the trailing arm 5 via a connecting portion 11. In addition, the knuckle 4 is rotatably connected to the respective outer end portions of the lower arm 7B and the upper arm 7A via connecting portions 12 and 13.

As illustrated in FIGS. 1 and 2, the connecting portions 11 and 12 for trailing arm 5 and the lower arm 7B disposed in the knuckle 4 are located below the axle 2, and the connecting portion 13 for the upper arm 7A is located above the axle 2.

As illustrated in FIGS. 1 and 2, connecting portions 14 and 15 rotatably connected to the sub-frame 6 are disposed in the respective inner end portions of the lower arm 7B and the upper arm 7A.

The trailing arm 5 is formed in a substantially arc shape in top view. The front end portion of the trailing arm 5 includes a connecting portion 16 rotatably connected to the vehicle body. The connecting portion 16 includes therein an elastic member. The sub-frame 6 includes fixed portions 16 and 17 to be mounted on the vehicle body. Note that other connecting portions include an elastic member. The base body corresponds to a member such as the knuckle 4 of the suspension assembly except for the trailing arm 5 pivotally attached to the base body.

Figure 3:
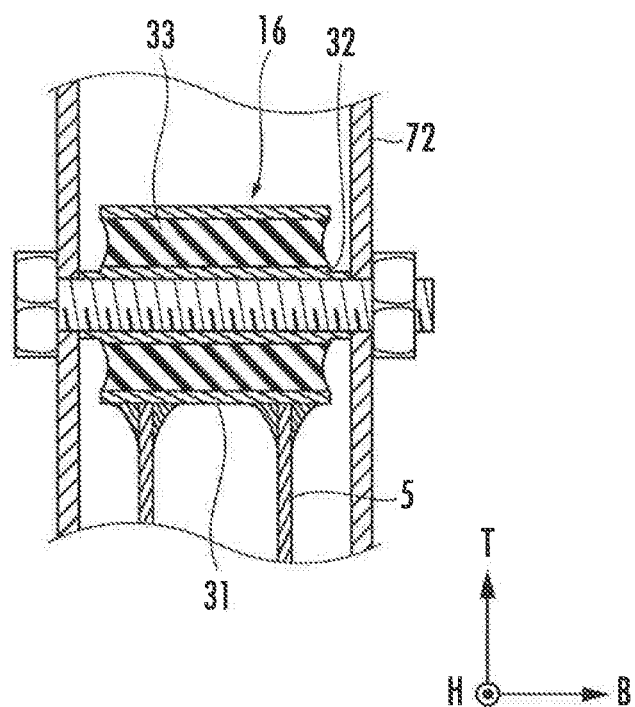
FIG. 3 is a cross-sectional view taken along line x-x in FIG. 2.

As illustrated in FIG. 3, which is a cross-sectional view taken along line x-x in FIG. 2, the connecting portion 16 having a circular cross section includes: an outer tube 31 fixed to an end portion of the trailing arm 5; an inner tube 32; and a rubber elastic member 33 disposed between the inner tube 32 and the outer tube 31. The elastic member 33 is bonded to the outer tube 31 and the inner tube 32 by vulcanization bonding or the like. The two ends of the inner tube 32 protrude from the outer tube 31 and the elastic member 33.

The elastic member 33 is also called a compliance bush and elastically deforms. Thus, the elastic member 33 of the connecting portion 16 of the trailing arm 5 allows forward and backward movement of the wheel and contributes to the improvement in ride comfort to a slight extent. The elastic member 33 serves as a cylindrical spring. Accordingly, the outer tube 31 is relatively twisted with respect to the inner tube 32 (when fixed to a vehicle body 72 with bolts and nuts as illustrated in the figures), strain energy is accumulated in the elastic member 33.

The following description will focus on the structure of a support pallet supporting the above described suspension assembly 1 having the trailing arm 5 and including a vertical movement mechanism vertically moving the trailing arm 5 and the axle 2.

Figure 4:
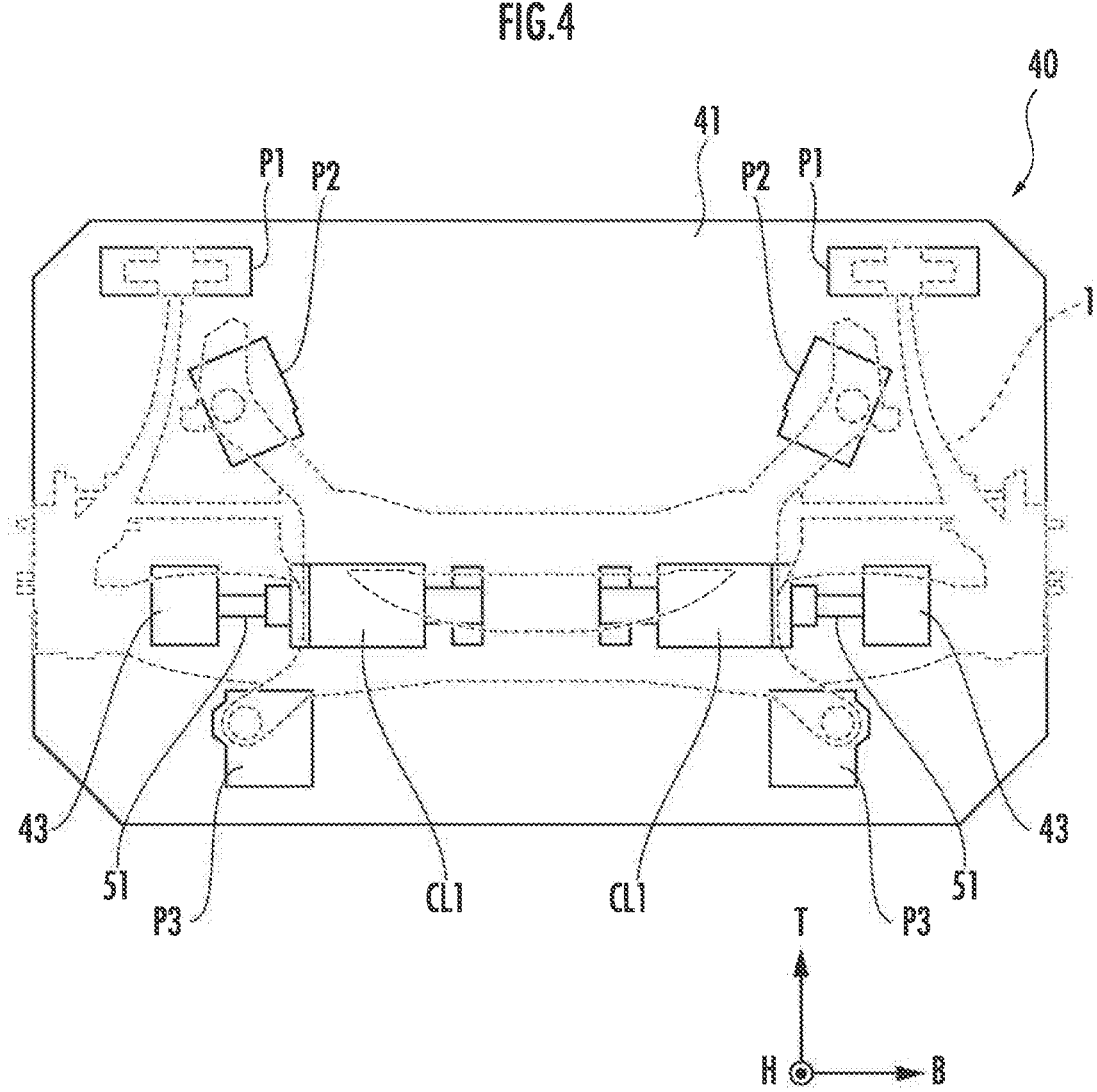
FIG. 4 is a plan view illustrating a support pallet according to the first embodiment of the present invention.
Figure 5:
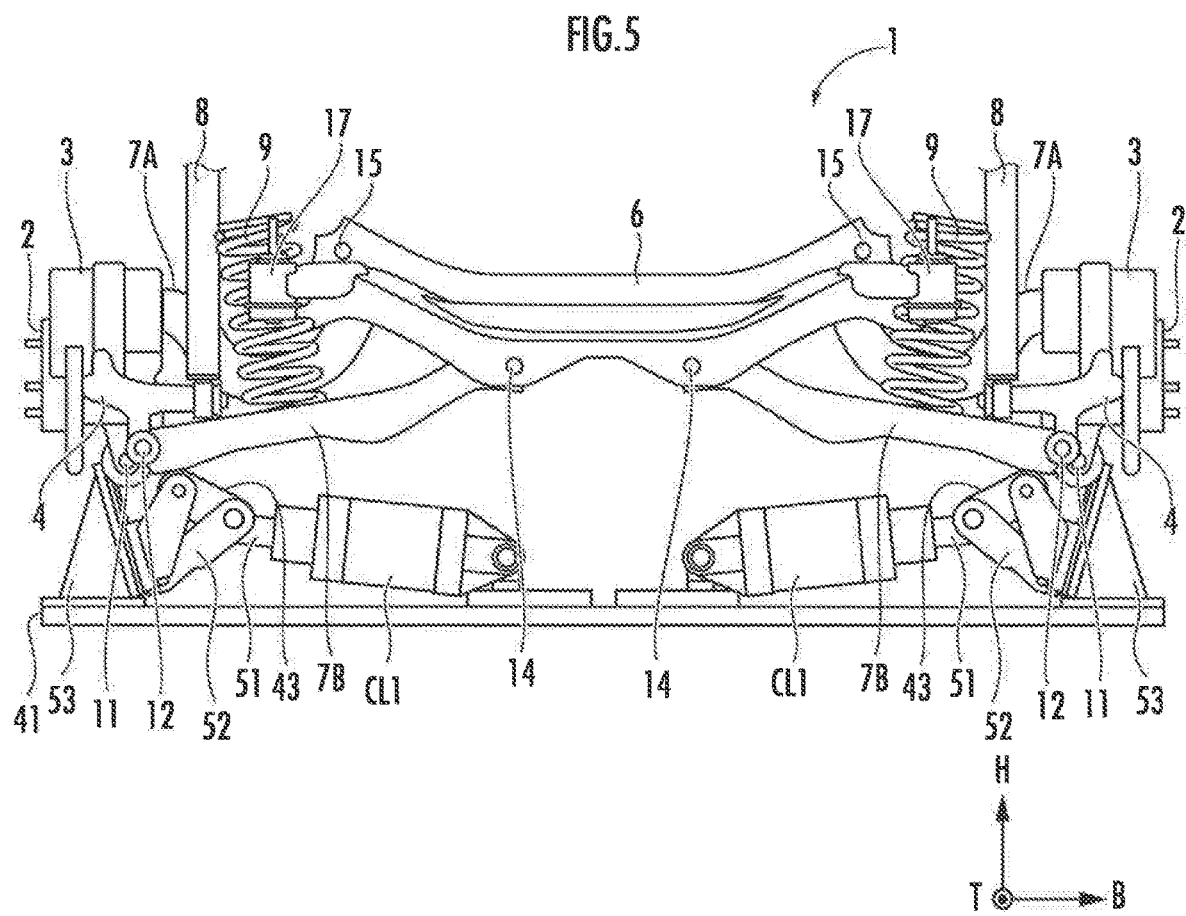
FIG. 5 is a front view illustrating a state (non-pressed state of the suspension assembly) in which the suspension assembly is mounted on the support pallet according to the first embodiment of the present invention.

FIG. 4 is a plan view illustrating a support pallet 40 according to the present embodiment. FIG. 5 is a front view illustrating a non-pressed state in which a movable member 43 does not press the axle 2 of the suspension assembly 1 in a state in which the suspension assembly 1 is mounted on the support pallet 40 according to the present embodiment.

Figure 6:
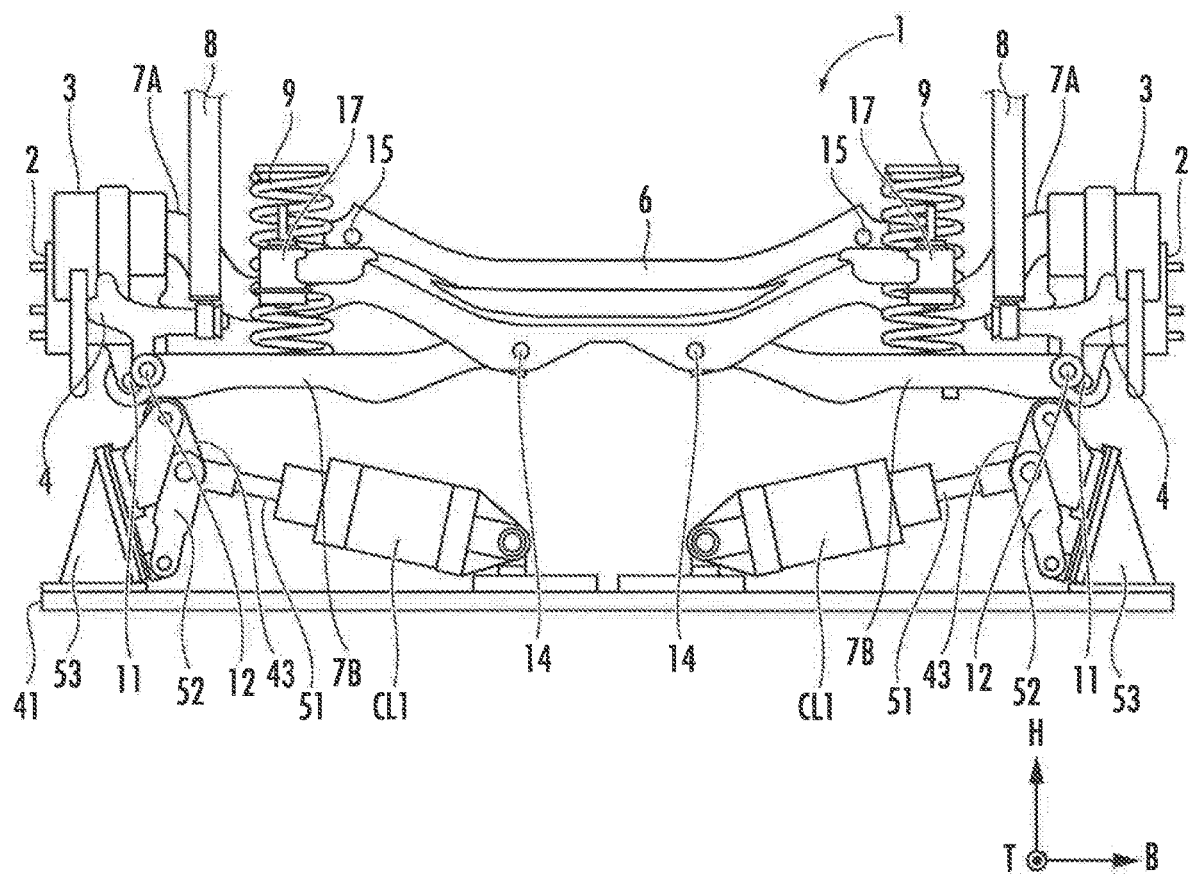
FIG. 6 is a front view illustrating a state (pressed state of the suspension assembly) in which the suspension assembly is mounted on the support pallet according to the first embodiment of the present invention.

FIG. 6 is a front view illustrating a state in which a movable member 43 presses the axle 2 of the suspension assembly 1 in a state in which the suspension assembly 1 is mounted on the support pallet 40 according to the present embodiment.

As illustrated in FIG. 4, the support pallet 40 includes a pallet 41; and support pillars P1, P2, and P3 erected on the pallet 41. The support pillar P1 supports the front end portion of the trailing arm 5. The support pillars P2 and P3 support the sub-frame 6.

The support pallet 40 also includes a vertically movable member 43 disposed at a position surrounded by the support pillars P1, P2, and P3. As illustrated in FIGS. 5 and 6, the support pallet 40 includes a link mechanism 52, a lifting portion 53, and a horizontal drive cylinder CL1 disposed on the pallet 41. The horizontal drive cylinder CL1 includes a rod 51 causing the movable member 43 to slidably move upward via the link mechanism 52 relative to the lifting portion 53. The movable member 43 contacts the lower surface near the connecting portion 12 at an outside end portion of the lower arm 7B. The horizontal drive cylinder CL1 drives the movable member 43 to press upward the rear end portion of the trailing arm 5 and the axle 2 from the non-pressed state (FIG. 5) to the pressed state (FIG. 6).

A receiving portion in an upper portion of the support pillars P1, P2, and P3 serves as the support body supporting the suspension assembly 1. The vertical movement mechanism is constituted by the movable member 43 and the horizontal drive cylinder CL1, and the like surrounded by the support pillars P1, P2, and P3. Note that FIGS. 5 and 6 omit the support pillars P1, P2, and P3 on the pallet 41 illustrated in FIG. 4 to clarify the other components.

Then, the suspension assembly mounting method will be described.

First, as illustrated in FIG. 5, the suspension assembly 1 is mounted on the support pillars P1, P2, and P3, and the movable member 43 on the pallet 41 (pallet mount step). Then, as illustrated in FIG. 6, the movable member 43 is moved to press upward the rear end portion (lower arm 7B) of the trailing arm 5 so that the suspension assembly 1 assumes a position (1G position: a first position) where its own weight load equivalent to the weight of the vehicle body is applied (pressing step). In this state, the whole pallet 41 is grasped with a lift robot (unillustrated).

Figure 7:
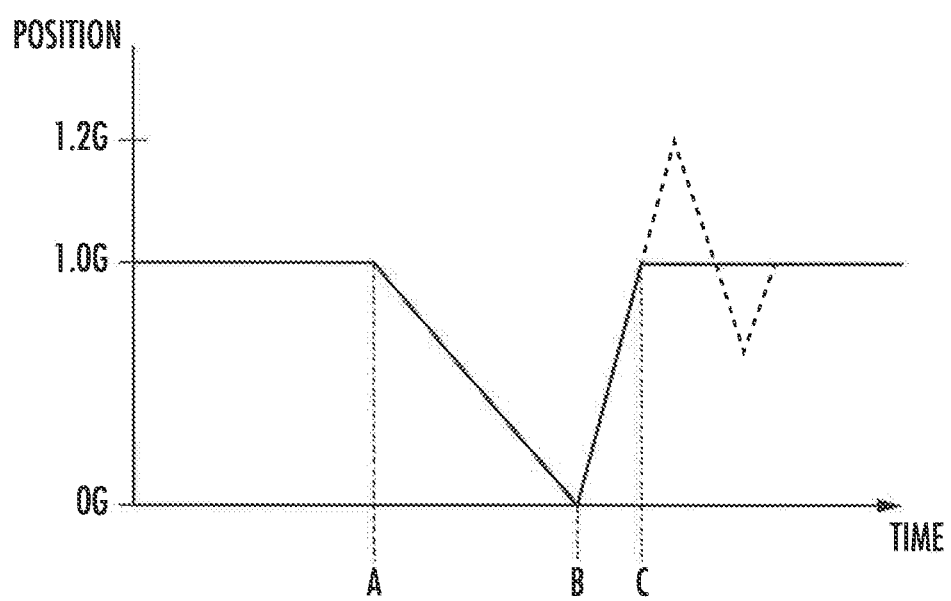
FIG. 7 is a graph illustrating how an axle position changes over time by a suspension assembly mounting method according to the first embodiment of the present invention.

Then, the lift robot moves the suspension assembly together with the pallet downward of the position for mounting the vehicle body until time point A illustrated by the graph in FIG. 7 while the axle maintains the 1G position.

Figure 8A:
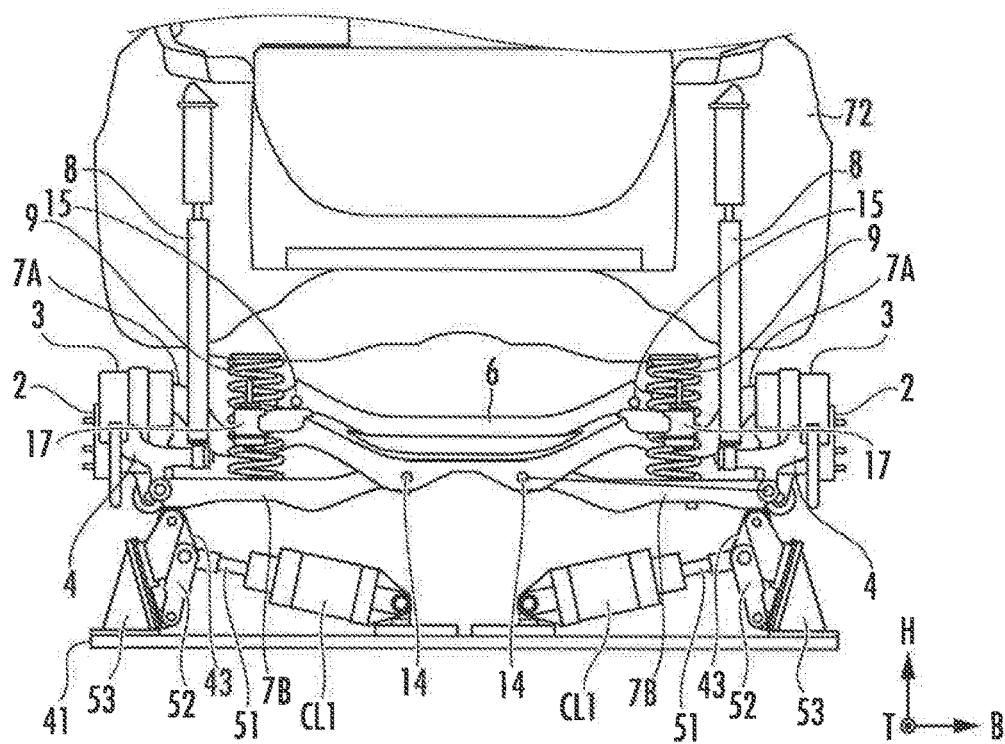
FIG. 8A is a front view illustrating a state in which the suspension assembly according to the first embodiment of the present invention contacts the vehicle body.

Then, at the time point A illustrated by the graph in FIG. 7, as illustrated in FIG. 8A, the pallet 41 is lifted from below the vehicle body 72 and the front end of the spring 9 mounted on the suspension assembly 1 contacts the vehicle body 72 (contacting step). Note that FIGS. 8A, 8B, and 8C omit the support pillars P1, P2, and P3 on the pallet 41 illustrated in FIG. 4 to clarify the other components.

Figure 8B:
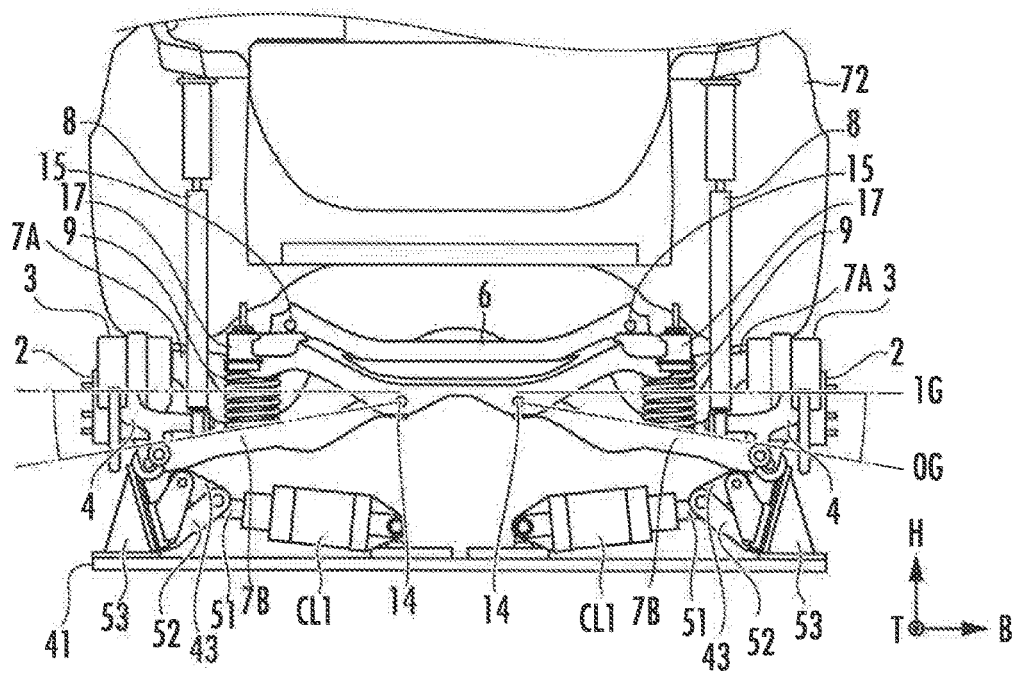
FIG. 8B is a front view illustrating a state in which the axle of the suspension assembly according to the first embodiment of the present invention is lowered.

Then, as illustrated in FIG. 8B, after the spring 9 contacts, the movable member 43 is stopped from pressing, the horizontal drive cylinder CL1 moves the movable member 43 downward to lower the rear end portion (lower arm 7B) of the trailing arm 5 to be fixed thereto. During the interval from the time points A to B illustrated by the graph in FIG. 7, the rear end portion (lower arm 7B) of the trailing arm 5 is gradually lowered and the pallet 41 together with the suspension assembly 1 is raised (raising step). During the interval from the time points A to B illustrated by the graph in FIG. 7, as illustrated in FIG. 8B, the upper end of the damper 8 contacts a predetermined position of the vehicle body 72, and then a reference pin (unillustrated) is also fitted to a predetermined position of the vehicle body 72. At the time B illustrated by the graph in FIG. 7, the suspension assembly 1 assumes a position (0G position: a second position) where its own weight load equivalent to the weight of the vehicle body is not applied. At this time, the overall positioning of the vehicle body 72 and the suspension assembly 1 is set by fitting the mounting reference pin on the pallet 41 into a SUS mounting reference hole.

Figure 8C:
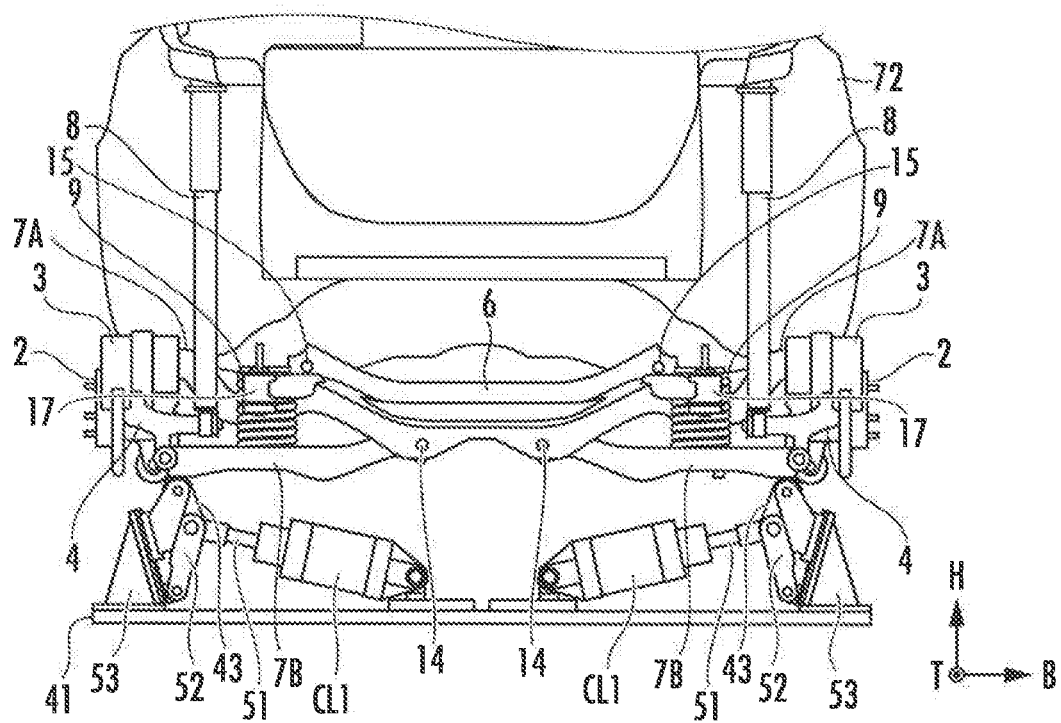
FIG. 8C is a front view illustrating a state in which the axle of the suspension assembly according to the first embodiment of the present invention is pressed and raised.

Then, as illustrated in FIG. 8C, during the interval from the time points B to C illustrated by the graph in FIG. 7, the movable member 43 is driven to press upward the rear end portion (lower arm 7B) of the trailing arm 5 until the rear end portion (lower arm 7B) of the trailing arm 5 is returned to the 1G position (C time point). At this state, a load is applied to the suspension assembly 1 on the pallet 41 (1G load, namely, vehicle weight, that is, a load of the weight of the vehicle body 72 is applied to the suspension assembly 1 when the tire is grounded and the vehicle body 72 is in a state via the tire and the suspension assembly 1). In this 1G position, the suspension assembly 1 is mounted on the vehicle body 72 (vehicle body mount step). This state allows elastic parts (compliance bush, etc.) constituting the suspension assembly 1 to be mounted in a loaded state.

Note that in this vehicle body mount step, the rear end portion (lower arm 7B) of the trailing arm can be swung relative to the sub-frame 6 swing step). The swing step allows a vertical swing about the 1G load position, as indicated by the broken line after the time point C in FIG. 7, before being set in the 1G load state, for the purpose of reducing twist hysteresis of the elastic member 33 (FIG. 3). When set in a predetermined position, a plurality of points are fastened with a nut runner (unillustrated) with bolts and nuts.

After the fastening completes, the lift robot puts an empty pallet 41 down in a place where the pallet 41 is to be placed. The pallet 41 moves to a place where the suspension assembly 1 is to be mounted. Then, the lift robot moves to receive another pallet 41, and receives the pallet 41.

Note that the present embodiment includes the sub-frame 6, but the present invention may be applied to a torsion beam type embodiment not including the sub-frame 6.

As described above, in the present embodiment, the suspension parts are mounted on a dedicated pallet 41 for assembling. The pallet 41 includes a mechanism for lifting the suspension in a complete vehicle load state (1G state). When the suspension is positioned by the lift robot, the spring 9 is not compressed. The suspension is positioned to the mounting place by the lift robot and the mounting reference pin is inserted. Then, the servo operation level of the lift robot is reduced (to maintain the current position), and the suspension is lifted in the complete vehicle load state by the vertical movement mechanism on the pallet 41. Then, the fixed portions 17 and 18 of the sub-frame 6 can be mounted on the vehicle body 72 while checking the safety and quality by monitoring the state position of the lift robot.

In addition, a load before and after 1G state is continuously applied to the suspension assembly mounted on the pallet 41 in the complete vehicle state. More specifically, the torsion (hysteresis) of the elastic member 33 (FIG. 3) of the suspension assembly 1 is eliminated by swinging, and then the suspension assembly 1 is mounted on the vehicle body 72 while keeping the 1G load state.

Second Embodiment

Figure 9A:
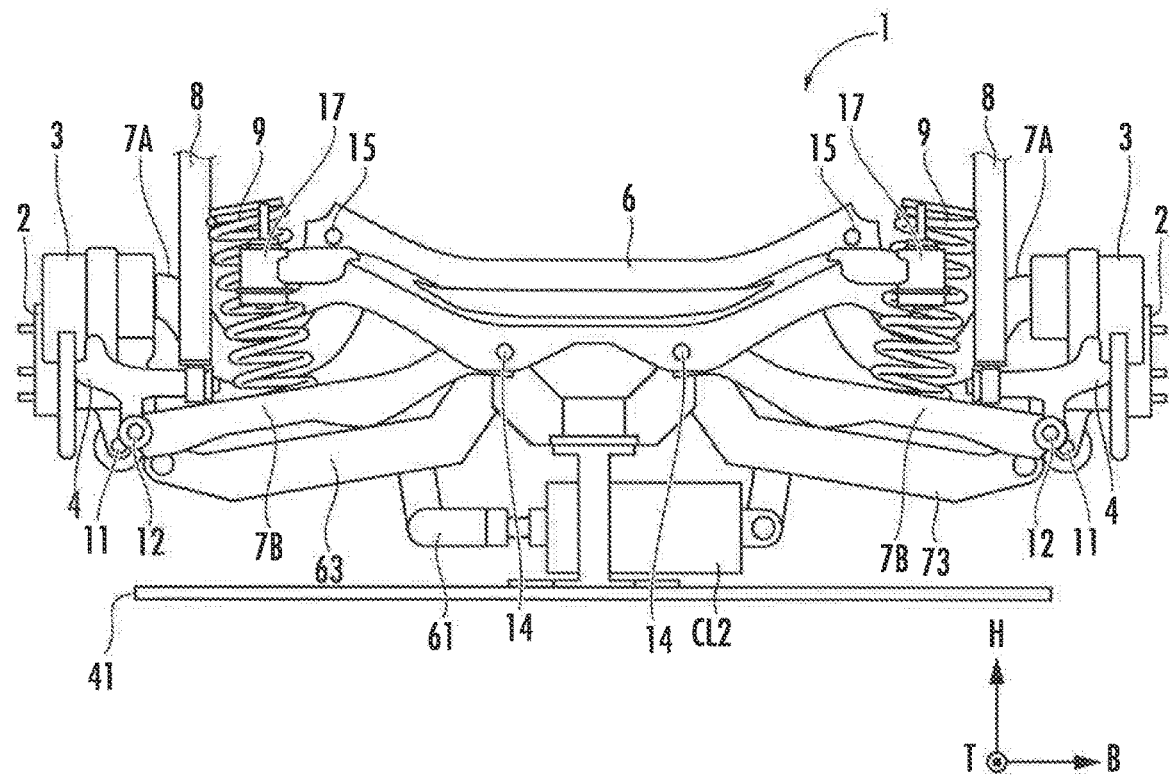
FIG. 9A is a front view illustrating a state (non-pressed state of the suspension assembly) in which the suspension assembly is mounted on the support pallet according to a second embodiment of the present invention.
Figure 9B:
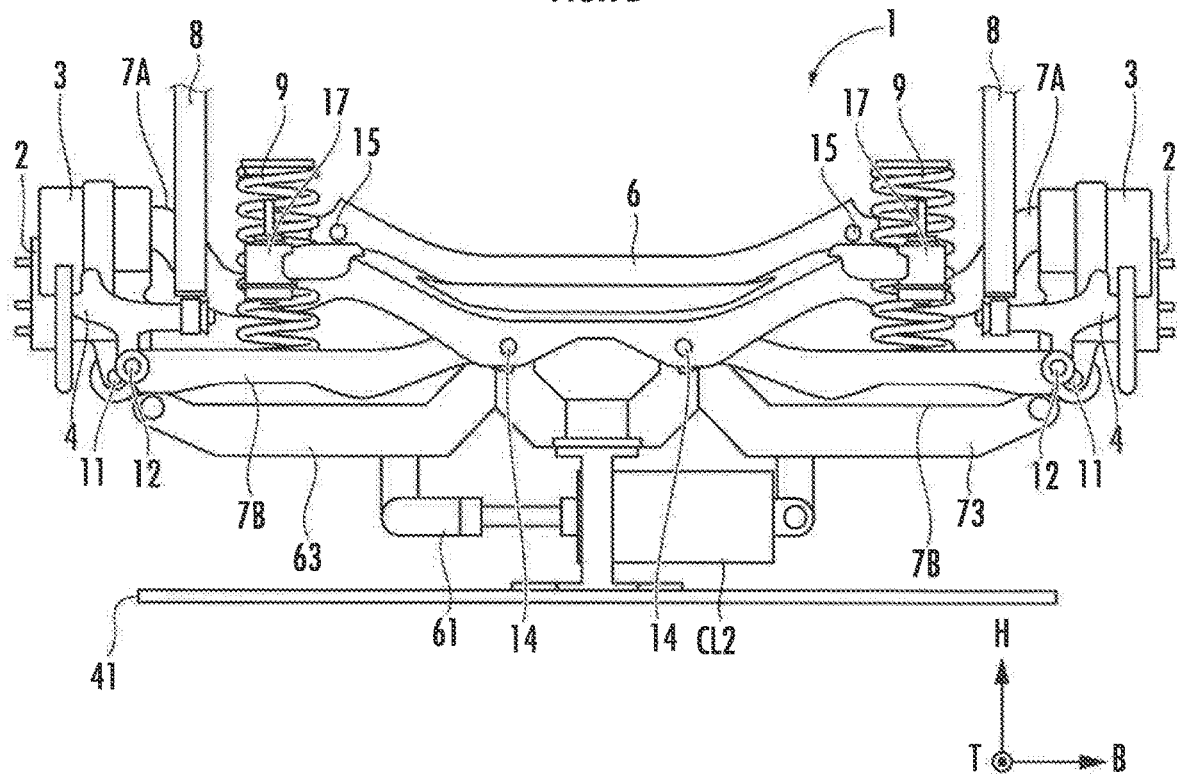
FIG. 9B is a front view illustrating a state (pressed state of the suspension assembly) in which the suspension assembly is mounted on the support pallet according the second embodiment of the present invention.

FIG. 9A is a front view illustrating a state (non-pressed state of the suspension assembly) in which the suspension assembly is mounted on the support pallet according to a second embodiment of the present invention. FIG. 9B is a front view illustrating a state (pressed state of the suspension assembly) in which the suspension assembly is mounted on the support pallet according to the second embodiment of the present invention. Note that FIGS. 9A and 9B omit the support pillars P1, P2, and P3 on the pallet 41 illustrated in FIG. 4 to clarify the other components.

The second embodiment has the same configuration as that of the first embodiment except that as illustrated in FIG. 9, the rear end portion (lower arm 7B) of the trailing arm 5 is vertically moved by a single horizontal drive cylinder CL2 and a common rod 61 disposed on the pallet 41 via left and right arms 63 and 73, instead of a pair of sets of link mechanisms 52, movable members 43, rods 51, and horizontal drive cylinders CL1 of the first embodiment.

The present invention can eliminate deflection caused by grasping the workpiece by the lift robot. The present embodiment can also reduce power consumption by the time required to reduce the servo operation level of the lift robot. The present embodiment can also simplify the facility by eliminating the auxiliary lifter supporting the suspension assembly. The present embodiment can also improve the quality (ride comfort) by changing the height of the suspension for each destination and derivation. The present embodiment allows a load to be applied to the suspension assembly before the suspension assembly is mounted on the vehicle body, and thus can ensure reliable mounting in consideration of the quality confirmation and the torsional hysteresis of the suspension assembly alone regardless of the type of vehicle.

What is claimed is:

1. A suspension assembly mounting method for mounting a suspension assembly on a vehicle, the suspension assembly having a base body and an arm member pivotally attached to the base body, the method comprising:
   a step of providing a vehicle body;
   a pallet mount step of mounting the suspension assembly on a pallet having a support body and a movable member relatively movable with respect to the support body, so as to fix the base body to the support body and engage the arm member with the movable member;
   after the pallet mount step, a pressing step of causing the movable member to press the arm member upward so that the suspension assembly moves into a position where an own weight load of the suspension assembly equivalent to a weight of the vehicle body is applied;
   after the pressing step, a contacting step of lifting up the pallet toward the vehicle body from under the vehicle body to cause the suspension assembly to contact the vehicle body;
   after the contacting step, a raising step of raising up the pallet toward the vehicle body while stopping the movable member from pressing the arm member to cause the arm member to lower so the suspension assembly assumes a position where the own weight load of the suspension assembly equivalent to the weight of the vehicle body is not applied; and
   after the raising step, a vehicle body mount step of causing the movable member to press the arm member upward to return to the suspension assembly to the position where the own weight load of the suspension assembly equivalent to the weight of the vehicle body is applied, and then mounting the suspension assembly on the vehicle body.

2. The suspension assembly mounting method according to claim 1, wherein the vehicle body mount step includes a step of swinging the arm member relative to the base body.

\* \* \* \* \*